W. H. CARRIER.
APPARATUS FOR CONTROLLING THE HUMIDITY AND TEMPERATURE OF AIR.
APPLICATION FILED AUG. 7, 1912.
1,095,156.
Patented Apr. 28, 1914.
2 SHEETS—SHEET 2.
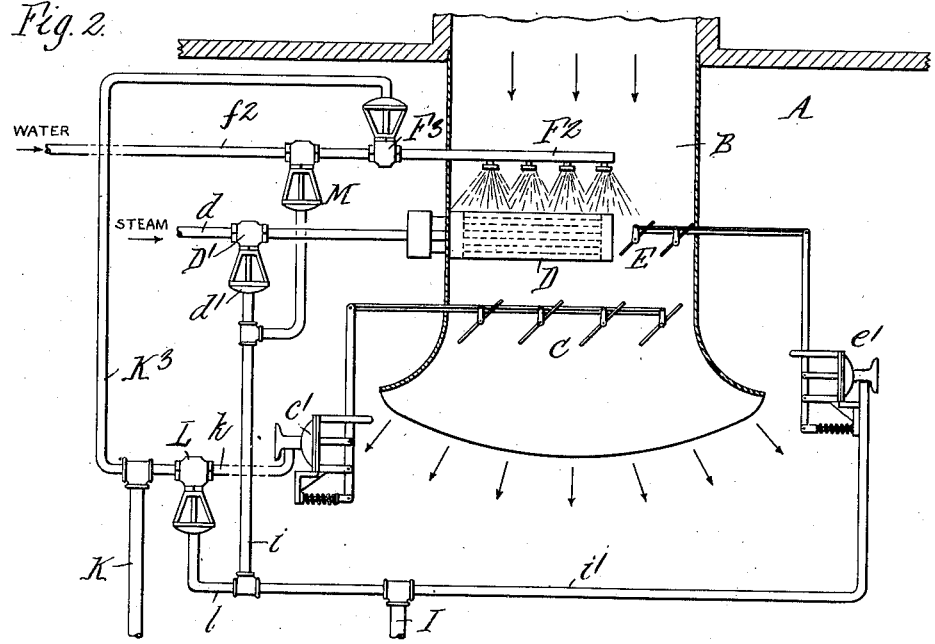
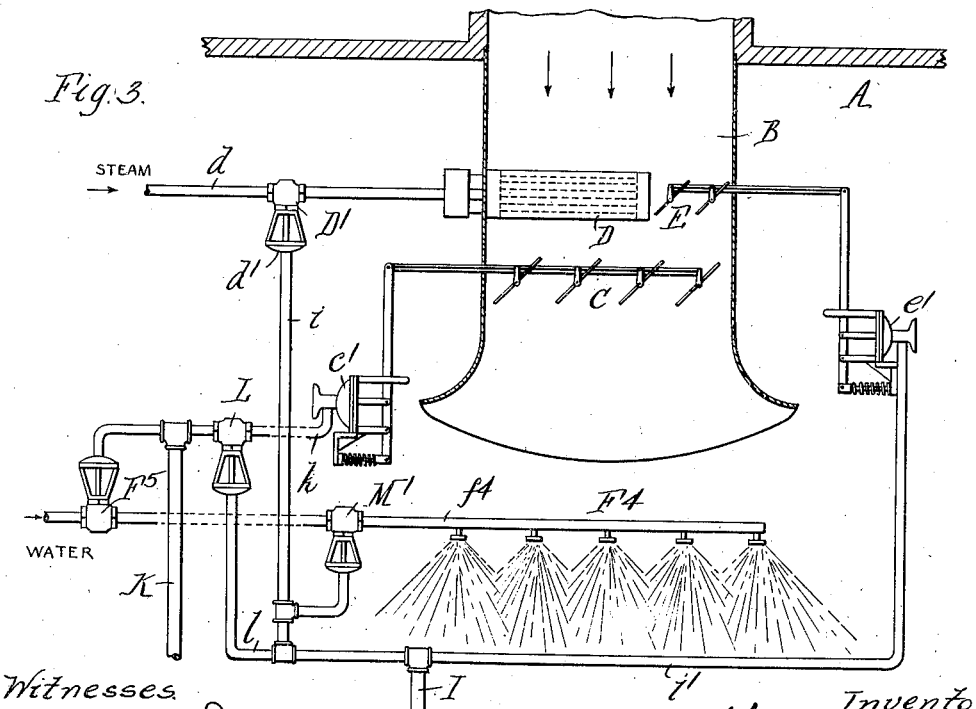

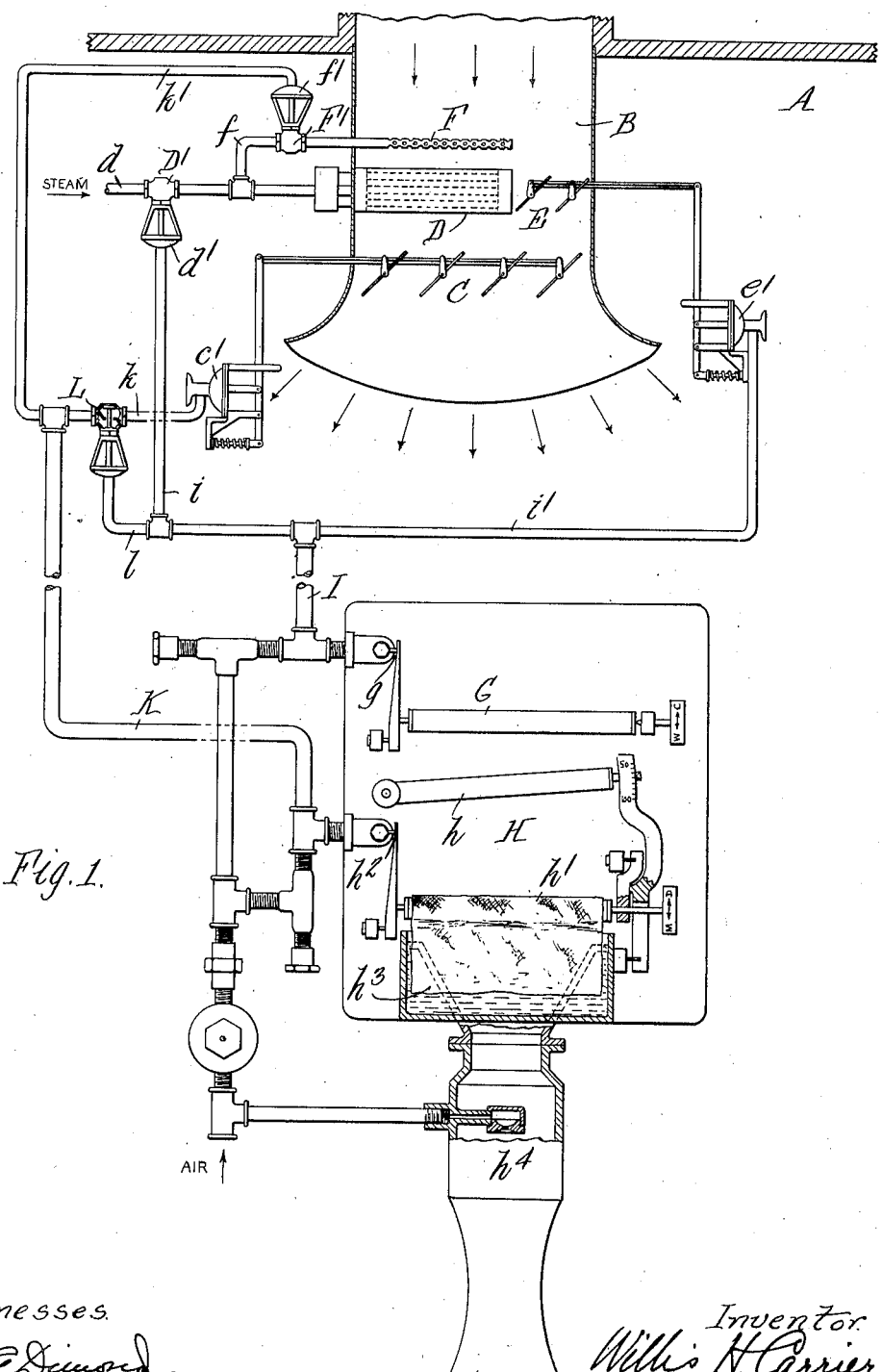

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

APPARATUS FOR CONTROLLING THE HUMIDITY AND TEMPERATURE OF AIR.

1,095,156.  Specification of Letters Patent.  Patented Apr. 28, 1914.

Application filed August 7, 1912. Serial No. 713,790.

*To all whom it may concern:*

Be it known that I, WILLIS H. CARRIER, a citizen of the United States, residing at Buffalo, in the county of Erie and State of New York, have invented a new and useful Improvement in Apparatus for Controlling the Humidity and Temperature of Air, of which the following is a specification.

This invention relates to apparatus for controlling the humidity and temperature in rooms or other inclosures, and has for one of its objects to provide a practical, efficient and economical apparatus by which any required percentage of humidity within a comparatively wide range can be maintained with a desired minimum temperature.

Another object of the invention is to provide an economical apparatus adapted for independently controlling the humidity and temperature in different rooms so as to give different required conditions in the several rooms.

According to this invention humidified air is supplied to the room and the control is obtained by the combined action of a thermostat which regulates a heater for the humidified air, and a differential hygrostat or other device which responds to changes in the humidity of the room and which regulates the supply of the humidified air to the inclosure and also controls a steam jet or other supplemental humidifying device for supplying additional moisture.

In the accompanying drawings, consisting of two sheets, Figure 1 is an elevation partly in section of a humidity and temperature controlling apparatus embodying the invention; Figs. 2 and 3 are fragmentary similar views showing slightly modified arrangements.

Like reference characters refer to like parts in the several figures.

A represents a room or other inclosure, and B an air duct by which the room is supplied with air saturated at a temperature such as to give approximately the required humidity and minimum temperature in the room. This saturated air is furnished by a humidifying apparatus (not shown) of any suitable kind, and when the conditions in several rooms are to be controlled, saturated air at the same temperature is supplied to the several rooms and a duplicate controlling apparatus is provided in each room. Since the several controlling apparatus are alike, only one is shown and described. The duct is provided with a damper C of any suitable sort for regulating the discharge of the air into the room.

D represents a heater, preferably a steam heating coil in the duct B for heating the saturated air, and E represents a by-pass damper of any suitable kind controlling a by-pass passage for the air around the heater. When this damper is closed the air flows through the heater and is heated, and when the damper is open it affords an unobstructed passage past the heater, thus enabling an increased supply of the saturated air for reducing the temperature in the room. This damper is preferably employed but is not absolutely essential. The heater is regulated by a valve $D'$ in its steam supply pipe $d$. These parts are the same in all of the arrangements illustrated in the drawings.

Referring first to the construction shown in Fig. 1, F represents a supplemental moistening device or nozzle for discharging steam, or moisture in other form, to furnish additional humidity. As shown in Fig. 1 this device consists of a perforated pipe or nozzle connected to a branch $f$ of the steam pipe $d$ and the discharge of steam therefrom is regulated by a valve $F'$ which is located between the nozzle and the heater valve $D'$ so that whenever the valve $D'$ is closed the steam is cut off from both the heater and the nozzle, whereas when the heater valve is open the discharge of steam from the nozzle can be regulated independently of the heater, as required, by the operation of the nozzle valve $F'$.

The heater D, and also the by-pass damper E, when this is employed, are controlled by a thermostat G which responds to changes in the temperature in the room, while the damper C and the steam nozzle F are controlled by a hygrostat or device H which responds to changes in the humidity in the room.

The temperature and humidity regulating devices G and H can operate the dampers and valves controlled thereby through suitable instrumentalities, such, for instance, as diaphragm motors operated by compressed air under the control of the regulating devices. The means shown in the drawings for this purpose are constructed as follows: $c'$ and $e'$ represent diaphragm motors for actuating the dampers C and E, respectively, and $d'$ and $f'$ represent diaphragm motors for actuating the heater valve D' and steam nozzle valve F', respectively. The thermostat G, which may be of any suitable construction, actuates an escape valve $g$ which regulates the pressure of compressed air in a pipe I which connects by a branch $i$ to the motor $d'$ of the heater valve and by a branch $i'$ to the motor $e'$ of the by-pass damper E.

The humidity regulating device H shown consists of a differential hygrostat like that disclosed in Patent No. 929,655, granted August 3, 1909, to Carrier and Comfort, assignors, and has expansible members $h$ and $h'$ which are respectively influenced by the dry and wet bulb temperatures of the air in the room and coöperate with a valve $h^2$ in such a way that the position of this valve depends upon the humidity of the air in the room. The expansible member $h'$ of the hygrostat is covered by a wet wick $h^3$, over which a current of air is caused to flow by an aspirator $h^4$. The hygrostat valve $h^2$ regulates the pressure of air in a compressed air pipe K which connects by a branch $k$ to the actuating motor $c'$ of the damper C, and by a branch $k'$ to the actuating motor $f'$ of the steam nozzle valve F'. A branch $l$ also connects the pipe I to a motor-actuated valve L in the branch pipe $k$, for connecting the motor $c'$ of the damper C with the compressed air supply for closing the damper, or with the atmosphere for opening the damper.

As the temperature of the room rises the thermostat G expands and closes the escape valve $g$, thus increasing the pressure on the motors of the heater valve D', by-pass damper E and three-way valve L, which acts to shut off steam from the heater D, open the by-pass damper E and move the valve L to the position for admitting pressure to the motor of the damper C. The reverse action of the heater valve, by-pass damper and valve L, is produced by a reduction of temperature in the room and consequent opening of the thermostat valve $g$. As the humidity rises, the relatively greater expansion of the wet bulb member $h'$ of the hygrostat closes the valve $h^2$, thereby increasing the pressure on the motors $c'$ and $f'$ and shutting off the steam to the nozzle F and closing the damper C. Under reverse conditions the action of the steam nozzle F and damper C will be reversed.

In the operation of the apparatus four conditions occur, which are as follows: First. When the temperature and humidity are both high, at which time the thermostat G will shut off steam from heater D and open the by-pass damper E, and the hygrostat will close damper C, shutting off the supply of saturated air at dew point temperature. Second. When the temperature is high and the humidity is low, at which time the thermostat will shut off steam from heater D and open by-pass damper E, and the hygrostat will open damper C, admitting saturated air at dew point temperature. So long as the steam is shut off from heater D and D', it is also shut off from the steam nozzle F, so that the steam is never injected into the room when the room temperature is high. Third. When the temperature is low and the humidity is low, at which time the thermostat will admit steam to the heater D and close the by-pass damper E, and the hygrostat will open the steam nozzle and the damper C, admitting heat, steam, and air previously saturated at dew point temperature. Fourth. When the temperature is low and the humidity is high, at which time the thermostat G will admit steam to the heater D and close the by-pass damper E, and the hygrostat will shut off steam from the steam nozzle F and will tend to close the damper C. However, the three-way valve L is provided so that when this condition occurs, or whenever steam is on the heater it is reversed, shutting off air to the motor $c$ of the damper C and releasing any that may already be in the motor, thus leaving the damper C open to admit the heat required.

While a differential hygrostat such as described is preferably employed, a device of other construction responding to changes in the humidity in the room could be used in place thereof.

The apparatus shown in Fig. 2 is similar in construction and operation to that above described, except that the supplemental moistening device or nozzle $F^2$ is arranged to discharge water, instead of steam into the air duct. This nozzle is connected to a water supply pipe $f^2$ provided with a diaphragm valve $F^3$ which is controlled by the hygrostat H in the manner described in connection with the corresponding valve F' in the first construction. The water pipe $f^2$ also has a diaphragm valve M controlled by the thermostat G. Thus the water spray is controlled in the same manner as the steam for supplemental moistening. When steam is on the heater D the hygrostat H regulates the supply of water by the nozzle $F^2$, and when the thermostat G shuts off steam from the heater it also acts to close the valve M and shut off the water.

The apparatus shown in Fig. 3 is constructed and operates like that shown in Fig. 2, with the exception the water spray nozzle $F^4$ is arranged to discharge directly into the room A. The water spray pipe $f^4$ has valves $F^5$ and M' corresponding in function, respectively, to the valves $F^2$ and M in the Fig. 2 arrangement.

I claim as my invention:

1. The combination of a humidity regulating device which responds to changes in humidity in a room, means controlled thereby for regulating the supply of humidified air to the room, a supplemental moistening device also controlled by said humidity regulating device, a thermostat influenced by the temperature of the room, a heater for the humidified air controlled by said thermostat, and means controlled by said thermostat which affects the control of said humidity regulating device on said air supply means, substantially as set forth.

2. The combination of a humidity regulating device which responds to changes in humidity in a room, means controlled thereby for regulating the supply of humidified air to the room, a supplemental moistening device also controlled by said humidity regulating device, a thermostat influenced by the temperature of the room, a heater for the humidified air controlled by said thermostat, and means controlled by said thermostat which affects the control of said humidity regulating device on said air supply means and also on said supplemental moistening device, substantially as set forth.

3. The combination of a humidity regulating device which responds to changes in humidity in a room, means controlled thereby for regulating the supply of humidified air to the room, a supplemental moistening device also controlled by said humidity regulating device, a thermostat influenced by the temperature of the room, a heater for the humidified air and a damper controlling a by-pass passage around said heater both controlled by said thermostat, and means controlled by said thermostat which affects the control of said humidity regulating device on said air supply means, substantially as set forth.

4. The combination of a hygrostat influenced by the humidity in a room, means controlled thereby for regulating the supply of humidified air to the room, a supplemental moistening device also controlled by said hygrostat, a thermostat influenced by the temperature of the room, a heater for the humidified air controlled by said thermostat, and means controlled by said thermostat which affects the control of said hygrostat on said air supply means and also on said supplemental moistening device, substantially as set forth.

5. The combination of a hygrostat influenced by the humidity in a room, fluid-pressure actuated means controlled by said hygrostat for regulating the supply of humidified air to the room, a fluid pressure actuated supplemental moistening device also controlled by said hygrostat, a thermostat influenced by the temperature of the room, a heater for the humidified air controlled by said thermostat, and means controlled by said thermostat which controls the flow of fluid pressure to and from the actuating device of said air supply means, substantially as set forth.

6. The combination of a duct for supplying humidified air to a room, a damper controlling said duct, a heater for the humidified air, a supplemental moistening device, a thermostat which is influenced by the temperature in said room and controls said heater, a hygrostat which responds to changes in humidity in the room and controls said damper and said supplemental moistening device, and means controlled by said thermostat which affects the action of said hygrostat on said damper, substantially as set forth.

7. The combination of a hygrostat influenced by the humidity in a room, means controlled thereby for regulating the supply of humidified air to the room, a steam heater for the humidified air, a steam nozzle for supplying moisture to the room, a valve for said steam nozzle which is controlled by said hygrostat, a thermostat influenced by the temperature of the room, a valve controlled by said thermostat which controls the supply of steam to both said heater and said steam nozzle, and means controlled by said thermostat which affects the control of said hygrostat on said air supply means, substantially as set forth.

8. The combination of means for regulating the supply of humidified air to a room, a supplemental moistening device, fluid pressure motors for actuating said air supply means and said supplemental moistening device, a hygrostat which is influenced by the humidity in the room and controls the pressure of the fluid which actuates said motors, a heater for the humidified air, a fluid pressure actuated device for regulating said heater, a thermostat which is influenced by the temperature of the room and controls the pressure of the fluid for actuating said heater regulating device, and a valve which is controlled by said thermostat and controls the flow of actuating fluid to the motor for said air supply means, substantially as set forth.

9. The combination of means for regulating the supply of humidified air to a room, a supplemental moistening device, fluid pressure motors for actuating said air supply means and said supplemental moistening device, a hygrostat which is influenced by the humidity in the room and controls the pressure of the fluid which actuates said motors, a steam heater for the humidified air, a fluid pressure actuated valve which controls the supply of steam to said heater and to said supplemental moistening device, a thermostat which is influenced by the temperature of the room and controls the pressure of the fluid for actuating said valve, and a valve which is controlled by said thermostat and controls the flow of actuating fluid to the motor for said air supply means, substantially as set forth.

10. The combination of means for regulating the supply of humidified air to a room, a supplemental moistening device, fluid pressure motors for actuating said air supply means and said supplemental moistening device, a hygrostat which is influenced by the humidity in the room and controls the pressure of the fluid which actuates said motors, a steam heater for the humidified air, a fluid pressure actuated valve which controls the supply of steam to said heater and to said supplemental moistening device, a thermostat which is influenced by the temperature of the room and controls the pressure of the fluid for actuating said valve, a valve which is controlled by said thermostat and controls the flow of actuating fluid to the motor for said supply means, and a damper in a by-pass passage around said heater which is also controlled by said thermostat, substantially as set forth.

Witness my hand this first day of August, 1912.

WILLIS H. CARRIER.

Witnesses:
 CHAS. W. PARKER,
 C. B. HORNBECK.